United States Patent [19]

Brewer et al.

[11] 4,106,861

[45] Aug. 15, 1978

[54] REDUCED HAZE PHOTOCHROMIC SYSTEMS

[75] Inventors: William R. Brewer, Hingham; Kenneth S. Norland, Belmont; Richard F. Wright, Acton, all of Mass.

[73] Assignee: Polaroid Corporation, Cambridge, Mass.

[21] Appl. No.: 704,699

[22] Filed: Jul. 12, 1976

[51] Int. Cl.² .................................................. G02B 5/23
[52] U.S. Cl. ..................................... 350/354; 427/163
[58] Field of Search ............... 350/160 P, 147, 175 R; 427/163, 164, 165; 428/913

[56] References Cited

U.S. PATENT DOCUMENTS

| | | | |
|---|---|---|---|
| 3,097,106 | 7/1963 | Blout et al. ........................... | 427/163 |
| 3,512,869 | 5/1970 | Plumat et al. ..................... | 350/160 P |
| 3,875,321 | 4/1975 | Gliemeroth et al. ............. | 350/160 P |
| 3,932,690 | 1/1976 | Gliemeroth ..................... | 350/160 P |

OTHER PUBLICATIONS

A. F. Perveyev et al., "AgCl-CuCl Photochromic Coatings", *Soviet Journal of Optical Technology*, Feb. 1972, pp. 117-118.

*Primary Examiner*—Stanley D. Miller, Jr.
*Assistant Examiner*—James W. Davie
*Attorney, Agent, or Firm*—Esther A. H. Hopkins

[57] ABSTRACT

The present invention is directed toward light-transmitting photochromic articles with low haze levels under illumination and processes for forming said articles without employing high temperature chemistry or heat treatments to initiate photochromism.

23 Claims, 4 Drawing Figures

REDUCED HAZE PHOTOCHROMIC SYSTEMS

BACKGROUND OF THE INVENTION

Photochromism, as applied to the present invention, define a property of a light-transmitting article whereby, upon stimulation by actinic radiation, the light-transmitting capability of such article is substantially reduced. Upon removal or diminution of the actinic radiation, the light-transmitting capability of the article is increased. Such reduction and return of the light-transmitting capability of articles contemplated by the present invention may be repeated through numerous cycles.

Photochromic light-transmitting articles in the form, for example, of lenses which may be employed in ophthalmic applications, have been known for many years and are now commercially available. Such commercially available lenses comprise silver halide materials dispersed in a glass matrix which involves rather complicated, high-temperature techniques and in situ formation of the silver halide materials in the matrix. See, for example, U.S. Pat. No. 3,208,860. According to the disclosure of that patent, silver halide crystals are dispersed in inorganic silicate glass and upon the application of radiation actinic to such a system, the silver halide materials react in such a way as to provide a diminution in the transmission characteristics of the glass. Upon removal of the actinic radiation, the silver halide crystals apparently return to their original transparent state and, accordingly, the transmission characteristics of the glass improve. Such systems basically comprise microscopic areas of entrapment of silver halides within the glass matrix — the crystal size being sufficiently small as to minimize light-scattering. The preferred method disclosed for making such photochromic articles is to incorporate the constituents of the desired crystalline phase in molten glass and thereafter precipitate the crystals in situ in the glass matrix. Heat treatment of the ultimately formed material is recommended to allow rearrangement of silver cations and halide anions and thereby form a separate phase within the glass matrix which assures appropriate photochromism. It is stated that such heat treatment comprises exposure of the glass article to the strain point temperature for about 16 hours, or to the softening temperature for about 15 minutes. U.S. Pats. Nos. 3,293,052 and 3,449,103 assigned to the same assignee as the aforementioned U.S. Pat. No. 3,208,860, relate to improvements in the basic photochromic glass system.

U.S. Pat. No. 3,466,216 describes a photochromic system wherein silicates comprising entrained silver halide materials are dispersed in a plastic binder and cast as a film. For reasons described in the above noted patents, such films may be made by taking a photochromic glass such as defined in the above-noted patents, grinding it and dispersing the ground glass in a suitable plastic binder. Another defined method is the production of tiny glass beads comprising silver halide crystals which may be dispersed in a binder and cast into a film.

In an article by A. F. Pervey and A. V. Milahaylov entitled AGCL - CUCL PHOTOCHROMIC COATINGS, "Soviet Journal of Optical Technology" February, 1972, photochromic films were produced by the simultaneous vacuum evaporation of silver chloride and cuprous chloride. Photochromism of the film was observed but, in accordance with the disclosure of copending U.S. patent application Ser. No. 672,237, it must be appreciated that the photochromic effect of such a system would probably not be continuously reversible since no method is disclosed for preventing loss of the reactants which are required to provide the requisite photochromic effect. Note, for example, the curves shown in the Perveyev et al. article.

Light transmitting articles having photochromic properties have been prepared which comprise a thin, uniform layer of silver halide sandwiched between, and in intimate contact with, continuous layers of materials which are substantially impermeable to the halogen comprising the silver halide. Such photochromic articles are disclosed and claimed in copending U.S. patent application Ser. No. 672,237. They show remarkable photochromic behavior but do exhibit substantial haze when viewed against a dark background while being illuminated. This is apparently due to light scattering from relatively large particles of silver. This haze accompanying the photochromic effect detracts from the transparency and appearance of the photochromic article.

OBJECTS OF THE INVENTION

It is a primary object of the present invention to provide photochromic articles with low haze levels under illumination.

It is a further object of the present invention to provide photochromic articles with low haze levels without employing high-temperature chemistry or heat treatments to initiate photochromism.

It is still further object of this invention to provide photochromic and light polarizing ophthalmic lenses having low haze levels under illumination.

Another object of this invention is to provide photochromic articles having low haze levels which, on adherence to the surface of window panes, impart to the window the ability to respond photochromically to incident sunlight.

It is another object of this invention to provide a process for providing photochromic articles having low haze levels upon illumination.

Further, it is an object of this invention to provide a process for producing photochromic, light polarizing ophthalmic lenses having low haze levels.

The invention accordingly comprises the process involving the several steps and the relation of one or more of such steps with respect to each of the others and the product possessing the features, properties and relation of elements which are exemplified in the following detailed disclosure and the scope of the application which will be indicated in the claims.

BRIEF DESCRIPTION OF THE DRAWINGS

For a fuller understanding of the nature and objects of the invention, reference should be had to the following detailed description taken in connection with the accompanying drawings wherein.

DETAILED DESCRIPTION OF THE INVENTION

Figure 1:
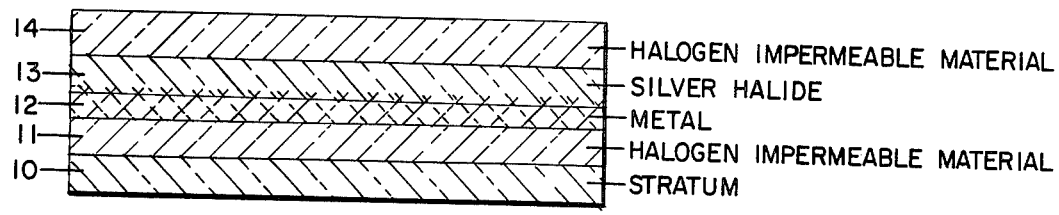
FIG. 1 is a diagrammatic cross-sectional view of the photochromic article of this invention.

In accordance with the present invention, a light transmitting photochromic article having a low haze level under illumination is prepared. One preferred embodiment of this article is a light-polarizing lens capable of ophthalmic uses. Another preferred embodiment is a flexible sheet which is adhered to window panes to respond photochromically to incident sunlight. Further, in accordance, with the present invention, processes for the preparation of these articles are disclosed.

The method of preparation of the articles of this invention comprises depositing, preferably by vapor deposition, a thin, continuous layer of material substantially impermeable to halogen onto a first transparent stratum and depositing onto this first halogen-impermeable layer a transparent layer of metal, such as; for example, gold or chromium which are preferred metals. Onto the metal layer a layer of doped silver halide, the halide comprising the the halogen to which the halogen-impermeable layer is impermeable is deposited, the dopant being preferably copper. Onto the silver halide layer a second thin continuous layer of halogen-impermeable material is deposited. After these depositions are made, the surface of the halogen-impermeable material is protected by adhering to it a second stratum, preferably similar to the first, or base stratum, and the article is primed to photochromic behavior either by exposure to light or by prolonged storage. This priming may require several days. The unprimed article is referred to as prephotochromic. It is not known what causes the appearance of the photochromic behavior nor why the metal layer results in substantially reducing the haze level of the final product, but it is believed that the metal upon irradiation or storage migrates into the silver halide stratum, and there forms a large number of nucleating loci, so that the silver particles formed on dissociation of the silver halide under the action of the incident light are small, numerous and non-scattering rather than large, few and scattering.

The first stratum, that is the support onto which the first halogen-impermeable layer is deposited may be a surface of a lens element. After deposition of the second halogen-impermeable layer, another stratum comprising a second lens element is preferrably adhered so that the entire structure may be used ophthalmologically. The second stratum or second lens element may be a polarizing lens. In that embodiment the final product is a polarizing photochromic ophthalmic lens having a low haze level.

The first stratum may be a thin, flexible, transparent plastic sheet such as, for example; 4 mil polyester film. The second stratum may also comprise this material. Other suitable materials comprise glass, polyethylene glycol bis allyl carbonate, etc.

Transparent substantially halogen impermeable materials which may be employed in the practice of the present invention include, for example, magnesium fluoride, aluminum oxide, magnesium oxides, beryllium oxides, zirconium oxides, silicon dioxide, cerium fluoride, thorium fluoride, various polymeric materials, such as, for example, polyethylene glycol dimethacrylate, polyvinyl chloride, etc., and, in general, may comprise any transparent material capable of "protecting" the silver halide layer by forming, preferably in contact therewith, a continuous substantially halogen-impermeable layer. As a general rule, it has been found that organic materials will not be as effective as inorganic materials in inhibiting penetration by halogen.

The first layer of substantially halogen impermeable material may be deposited in two applications, the initial 0.1 micron of material being deposited at a rate of about 2000 A/min. followed by the next 0.1 to 0.3 micron being deposited at a rate of about 200 A/min. The second layer of substantially halogen-impermeable material may be deposited onto the silver halide film at a rate of approximately 200 A/min. for its entire thickness. It is understood that those skilled in the art will be able to make adjustment in deposition rates. Good results have been achieved when the ratio of the rate of deposition of the initial 0.1 micron of substantially halogen impermeable material to the rate of deposition of the remainder of the layer is on the order of about 10:1.

The transparent layer, responsible for the reduced haze formation accompanying the photochromism comprises a metal. It is deposited between the first halogen impermeable stratum and the silver halide layer. Examples of preferred metals which may be used include, for example, the noble metals, such as gold, platinum and palladium, and chromium. The metal may be deposited in any suitable manner as, for example from a colloidal suspension, but is preferably vacuum deposited.

DESCRIPTION OF THE DRAWINGS

Figure 2:
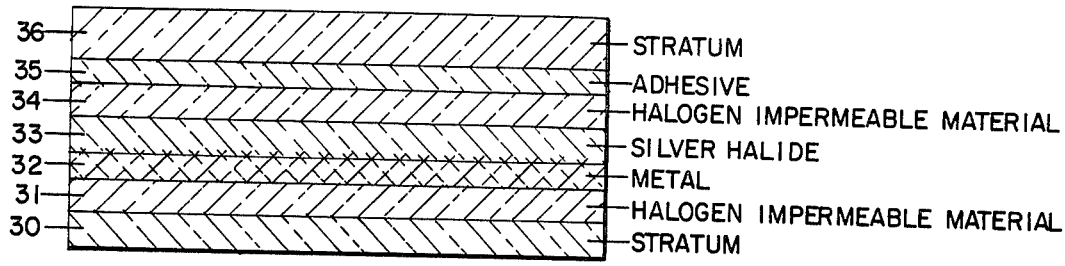
FIG. 2 is a cross-sectional view of a preferred embodiment of the article of this invention.
Figure 3:
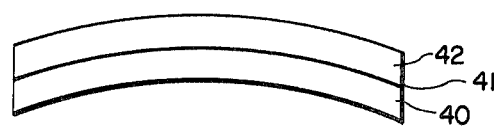
FIG. 3 is a cross-sectional view of a lens and illustrates a preferred embodiment of the article of this invention.

As detailed in illustrative FIG. 1, the photochromic low haze level light transmitting article of this invention comprises, in order, on a stratum 10, a first layer of a halogen-impermeable material 11; a layer of metal which is effective to reduce substantially the photochromic haze of the article 12; a layer which provides the photochromic effect; comprising silver ions, copper ions and a halide 13; and a second layer of halogen-impermeable material, 14. In FIG. 2 is illustrated a cross-sectional view of a preferred embodiment of the photochromic article of this invention wherein 30 is a first stratum or support; 31 is a first layer of a halogen-impermeable material; 32 is a layer of a metal; 33 is a layer of doped silver halide; 34 is a second layer of halogen-impermeable material; 35 is a layer of adhesive and 36 is a second stratum. FIG. 3 is a cross-sectional view of a photochromic low haze level lens prepared in accordance with this invention wherein 42 and 40 are first and second lens elements and 41 comprises the layers in the photochromic article.

Figure 4:
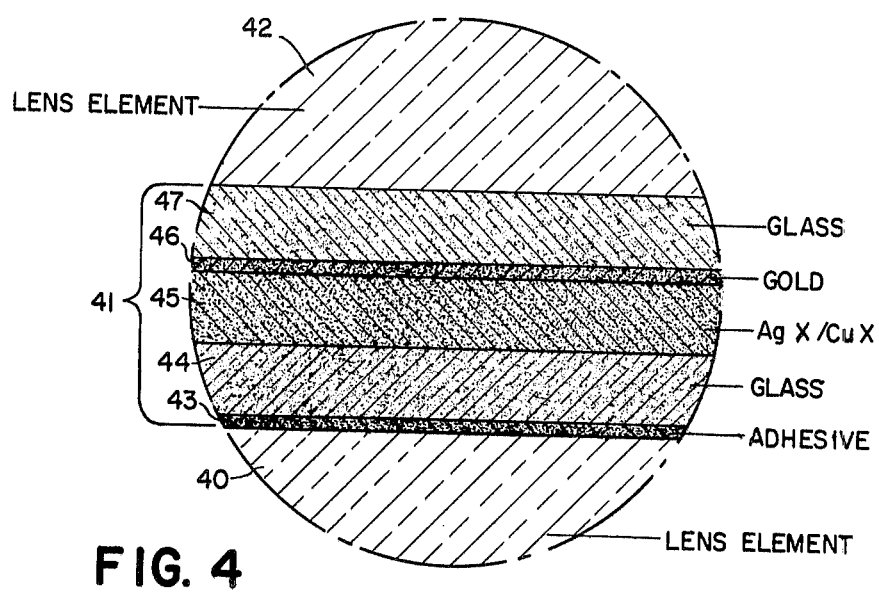
FIG. 4 is a further enlarged cross-sectional view of the lens of FIG. 3 illustrating, in detail, the arrangement of layers comprising the photochromic article of the present invention.

FIG. 4 is a further enlarged cross-sectional view of the lens of FIG. 3 showing diagrammatically the layers comprising 41. In FIG. 4, 40, 41 and 42 are as in FIG. 3 while 47 is a first layer of a halogen-impermeable material, for example, glass; 46 is a layer of metal, for example, gold; 45 is a layer of silver halide doped with copper halide; 44 is a second layer of halogen-impermeable material; and 43 is an adhesive used to bind the photochromic article to the second lens element.

Photochromic behavior, which is referred to in the example below, is measured by the reversible decrease in percent transmission of the article on exposure to illumination. Failure of the sample to recover completely its initial absorbance even after long recovery times in the dark is defined as "printout".

Permanent haze or light scatter is measured by using an integrating sphere and a spectrophotometer or a haze meter. Permanent haze level present in the photochromic article of this present invention is very low, as low as in a standard commercial polarizer such as the product sold by Polaroid Corporation as H-sheet.

Photochromic haze is judged by eye using comparison samples. The samples are illuminated by noon sun equivalent oblique radiation. Observation is made through the illuminated photochromic sample toward a dark image or dark diffuse background. Photochromic haze is evidenced by a light scatter against the dark background.

The following example is given to illustrate the present invention and is not intended to limit the scope thereof.

EXAMPLE

A. Vacuum Deposition of Layers

A carefully cleaned lens element was placed on a holder on a planetary rotating device. Planetary rotation was used to assure even deposition of layers. A tantalum filament was charged with a 95:5 by weight mixture of silver bromide and copper bromide in a vacuum chamber. This charge was pre-melted, removed from vacuum and inserted into a first thermal source of a photochromic coater which comprises a base plate in a bell jar, an electron beam source and two thermal sources as well as access to the vacuum pump and to a nitrogen line. The second thermal source of the coater was charged with gold and the electron-beam source was charged with Schott glass #8329, a borosilicate glass manufactured by Jenaer-Schott, Mainz, Germany. The coater was then closed to the atmosphere and evacuated to $10^{-6}$ torr. The first layer of Schott glass was deposited at a rate of 40 A/sec. on the concave surface of a polycarbonate lens element to a thickness of 1 micron. Next, a layer of gold was thermally deposited at the rate of 0.2 A/sec. on the Schott glass to a thickness of 10 A. The silver bromide: copper bromide was then thermally deposited at a rate of 2 A/sec. to a thickness of 0.5 micron. Then a second layer of glass was applied in the same manner as the first glass layer. After about 5 minutes, the vacuum was broken by backfilling the system with nitrogen gas.

B. Completion of Preparation of Lens

The vacuum chamber was opened to an atmosphere comprising less than 25% relative humidity. The lens element was quickly removed and cemented to a matching convex curved polycarbonate lens element using as the adhesive ultraviolet activated Optical Adhesive #60 of the Norland Optical Co., a polymerizing, nonsolvent adhesive.

The completed article was then primed by exposure to sunlight.

C. Testing

The absorbance of the sample was measured at 550 nm using a Cary 14 spectrophotometer. The sample was then exposed for approximately 5 minutes to a noon sun equivalent Xenon arc. The sample was removed from the light and reinserted into the spectrophotometer. The absorbance at 550 nm was read as a function of time. Upon exposure the percent transmission changed from 75 to 22%. Removal of the sample from the light resulted in an increase in transmission to about 72% in a time of 4 minutes.

Photochromic haze was adjudged significantly lower than that present in a comparable sample prepared according to the same procedure and the same ingredients and proportions without the gold layer.

In addition to gold, other noble metals and chromium, the present invention encompasses the employment of any metal which produces a significant reduction in the photochromic haze level evident in a silver halide photochromic system of the type described compared to the same system without the metal present.

Since certain changes may be made in the above products and processes without departing from the scope of the invention herein involved, it is intended that all matter contained in the above description shall be interpreted as illustrative and not in a limiting sense.

What is claimed is:

1. In a photochromic article comprising:
   (a) a first continuous layer of material substantially impermeable to halogen selected from the group consisting of chlorine, bromine and iodine;
   (b) a continuous layer comprising silver ions, copper ions and halide ions, said halide ions selected from the group consisting of chloride, bromide and iodide; and
   (c) a second continuous layer of material substantially impermeable to the halogen comprising said halide ion; said layer of silver ions, copper ions and halide ions being between said layers of material substantially impermeable to the halogen; the improvement wherein said article comprises a continuous layer of a metal in a quantity effective to substantially reduce photochromic haze, said layer of metal being positioned between said first layer of halogen impermeable material and said layer of silver ions, copper ions and halide ions.

2. The photochromic article of claim 1 wherein said metal is selected from the group consisting of gold, platinum, palladium and chromium.

3. The article of claim 1 wherein said metal is gold.

4. The article of claim 3 wherein said layer of gold is approximately 1 to 10 A thick.

5. The article of claim 3 wherein said layer comprising silver ions, copper ions and halide ions is approximately 0.5 micron thick.

6. The article of claim 1 wherein said metal is chromium.

7. The article of claim 1 wherein said copper ions are present in a range of 2 to 10 weight percent of the silver ions present.

8. The article of claim 1 wherein said layer of silver ions, copper ions and halide ions is approximately 0.1 to 2 microns thick.

9. The article of claim 1 which includes first and second transparent support strata adhered respectively to said first and second layers of halogen impermeable material.

10. The article of claim 9 wherein said first and second strata are respectively first and second lens elements.

11. The article of claim 10 wherein said second stratum is a polarizing lens element.

12. The article of claim 9 wherein said first and second strata comprise flexible plastic sheets.

13. A photochromic article comprising, in order, on a support:
   (a) a first continuous layer of material substantially impermeable to halogen selected from the group consisting of chlorine, bromine and iodine;
   (b) a continuous layer of a metal in a quantity effective to substantially reduce photochromic haze;

(c) a continuous layer comprising silver ions, copper ions and halide ions, said halide ions comprising halogen selected from the group consisting of chlorine, bromine and iodine; and (d) a second continuous layer of material substantially impermeable to the halogen comprising said halide ion.

14. A process for forming a light transmitting article capable of being joined to form a photochromic low photochromic haze level light transmitting article which comprises:

depositing, in order, upon a support (i) a first continuous layer of a material substantially impermeable to halogen selected from the group consisting of chlorine, bromine, and iodine;

(ii) a continuous layer of a metal in a quantity effective to substantially reduce photochromic haze;

(iii) a continuous layer comprising silver ions, copper ions and halide ions, said halide ions comprising halogen selected from the group consisting of chlorine, bromine and iodine to which said first continuous layer is substantially impermeable;

(iv) a second continuous layer of material substantially impermeable to the halogen comprising said halide ion, said first continuous layer, said continuous layer of metal and said second continuous layer being transparent to light actinic to said layer comprising silver ions, copper ions and halide ions.

15. A process as defined in claim 14 wherein said layer of metal comprises gold.

16. A process as defined in claim 14 wherein said layer of metal comprises chromium.

17. The process wherein the light transmitting article formed by the process of claim 14 is primed to form a photochromic low photochromic haze level light transmitting article.

18. A process as defined in claim 17 wherein said light transmitting article is primed by exposure to sunlight.

19. A process as defined in claim 14 wherein said first continuous layer of halogen impermeable material is deposited on a transparent stratum.

20. A process as defined in claim 14 which further includes adhering a second stratum to the surface of said second layer of halogen impermeable material.

21. A process as defined in claim 20 wherein said first and second strata comprise lens elements.

22. A process as defined in claim 21 wherein said second lens element is a polarizing lens element.

23. A process as defined in claim 20 wherein said first and second strata comprise flexible plastic sheets.

* * * * *